US007895879B2

(12) United States Patent
Robert

(10) Patent No.: US 7,895,879 B2
(45) Date of Patent: Mar. 1, 2011

(54) SAMPLE HOLDER FOR HOLDING SAMPLES AT PRE-DETERMINED ANGLES

(75) Inventor: James M. Robert, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 11/951,660

(22) Filed: Dec. 6, 2007

(65) Prior Publication Data

US 2009/0145247 A1 Jun. 11, 2009

(51) Int. Cl.
*G01B 21/30* (2006.01)

(52) U.S. Cl. ...................................................... 73/1.89

(58) Field of Classification Search ...................... None
See application file for complete search history.

(56) References Cited

U.S. PATENT DOCUMENTS 2,715,830 A * 8/1955 Lewis et al. .................. 73/1.89
3,505,861 A * 4/1970 Schoefer et al. ............... 73/105
3,675,463 A * 7/1972 Munschauer et al. .......... 72/448
4,442,721 A * 4/1984 Singer ..................... 73/863.31
4,523,450 A * 6/1985 Herzog ....................... 73/1.81
4,669,227 A 6/1987 Treppner
5,408,893 A * 4/1995 McLeroy ................. 73/864.44
5,440,941 A * 8/1995 Kalidindi ................. 73/864.64
6,016,684 A * 1/2000 Scheer et al. ................ 73/1.89
6,258,326 B1 7/2001 Modlin
6,591,658 B1 * 7/2003 Yedur et al. .................. 73/1.89
2002/0157449 A1 * 10/2002 Asanuma .................... 73/1.79
2006/0277972 A1 * 12/2006 Chand et al. ................. 73/1.89
2008/0016941 A1 * 1/2008 Tisserand et al. ............ 73/1.89

FOREIGN PATENT DOCUMENTS

DE 3427355 * 1/1986

* cited by examiner

*Primary Examiner*—Robert R Raevis
(74) *Attorney, Agent, or Firm*—Anthony Canale; Roberts Mlotkowski Safran & Cole, P.C.

(57) ABSTRACT

The invention generally relates to atomic resolution imaging, and, more particularly, to systems and methods for calibrating an atomic resolution measurement tool. A sample holder for holding test samples used in measuring linearity of an atomic force microscope is provided. The holder includes a body having a top surface, and a plurality of inclined regions formed in the body and spaced apart along the top surface. Each of the inclined regions is structured and arranged to hold a test sample used to measure linearity of an atomic force microscope at one of a plurality of predefined angles.

9 Claims, 1 Drawing Sheet

SAMPLE HOLDER FOR HOLDING SAMPLES AT PRE-DETERMINED ANGLES

FIELD OF THE INVENTION

The invention generally relates to atomic resolution imaging, and, more particularly, to systems and methods for characterizing an atomic resolution measurement tool.

BACKGROUND OF THE INVENTION

An atomic force microscope (also referred to as a scanning force microscope) is a measurement tool for imaging surfaces with atomic resolution. A conventional atomic force microscope (AFM) typically comprises a probe (e.g., cantilever and tip) that is raster-scanned across a sample to be imaged. Measuring the deflection of the probe provides a topographic scan (e.g., image) of the sample.

An AFM that is not properly characterized will exhibit inaccuracies (e.g., image artifacts) in the scanned images. To this end, systems and methods for detecting and correcting vertical (e.g., z direction) and lateral (x, y direction) non-linearity of movement of an AFM have been developed. For example, imaging a test sample with precisely known surface features can be used to detect non-linearities in an AFM, after which corrections to the image may be determined.

In some conventional z-direction testing techniques, test samples are inclined to an unknown angle by placing a block under the test sample. However, this is difficult with test samples having small dimensions and/or high aspect ratios.

Accordingly, there exists a need in the art to overcome the deficiencies and limitations described hereinabove.

SUMMARY OF THE INVENTION

In a first aspect of the invention, there is a holder for holding test samples used in measuring linearity of an atomic force microscope. The holder includes a body having a top surface, and a plurality of inclined regions formed in the body and spaced apart along the top surface. Each of the inclined regions is structured and arranged to hold a test sample used to measure linearity of an atomic force microscope at one of a plurality of predefined angles.

In a second aspect of the invention, there is provided a holder for holding test samples for measuring linearity of an atomic force microscope. The holder comprises a generally rectangular body having a top surface, and a plurality of inclined regions formed in the body and spaced apart along the top surface. Each respective one of the plurality of inclined regions is structured and arranged to hold a test sample used to determine linearity of an atomic force microscope at one of a plurality of predefined angles. Moreover, each respective one of the plurality of predefined angles differs from an adjacent one of the plurality of predefined angles by about 1°. Additionally, each respective one of the plurality of inclined regions includes a first surface that intersects the top surface at a respective one of the plurality of predefined angles, and a second surface arranged generally perpendicular to the first surface and intersecting the top surface and the first surface.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to atomic resolution imaging, and, more particularly, to systems and methods for characterizing an atomic resolution measurement tool. Exemplary embodiments of the invention include a sample holder having multiple angled slots formed in a surface to hold test samples. The sample holder allows a user to choose any one of multiple angled slots to place test samples with great accuracy as to the known angle of the slot (and, therefore, the test sample). Aspects of the invention thus allow a user to precisely locate a test sample with respect to an imaging device (e.g., an atomic force microscope), such that the imaging device can be accurately characterized.

Figure 1:
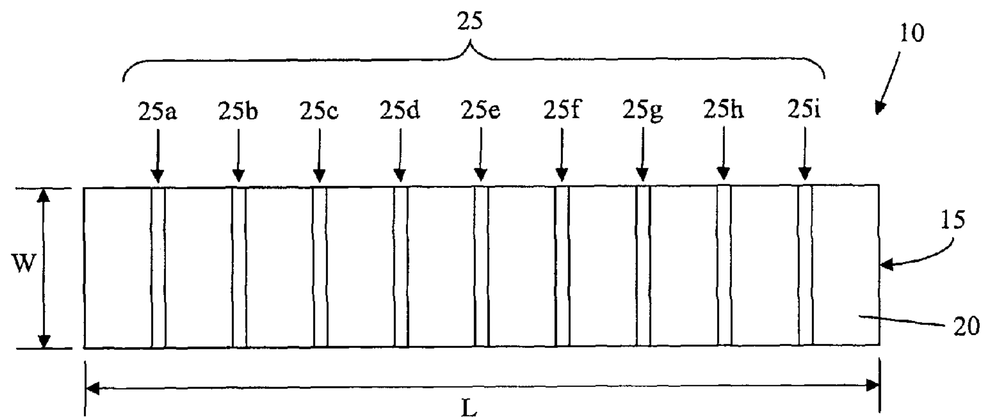
FIG. 1 shows a top view of a sample holder according to aspects of the invention.

FIG. 1 shows a sample holder 10 according to aspects of the invention. In embodiments, the sample holder includes a block 15 (e.g., a chuck) having a top surface 20. Formed in the top surface 20 are a plurality of inclined regions 25 (e.g., 25*a*-25*i* shown in FIG. 1). For example, the block 15 may be composed of aluminum, and the inclined regions 25*a*-25*i* may constitute slots that are milled through the top surface 20 and into the body of the block 15. However, the invention is not limited to an aluminum block, but, rather, other materials (e.g., brass, polymer, etc.) may be used with the invention. Moreover, the invention is not limited to inclined regions formed by milling; instead, the inclined regions 25 may be formed in any suitable manner (e.g., molding, extrusion, etc.).

In further embodiments, the block 15 has the general shape of a rectangular solid with a length "L" of about 6.00 inches, a width "W" of about 1.00 inches, and a height "H" of about 0.25 inches. However, the invention is not limited to a block of this size and shape; rather, the block may be arranged in any suitable size and shape within the scope of the invention.

Figure 2:
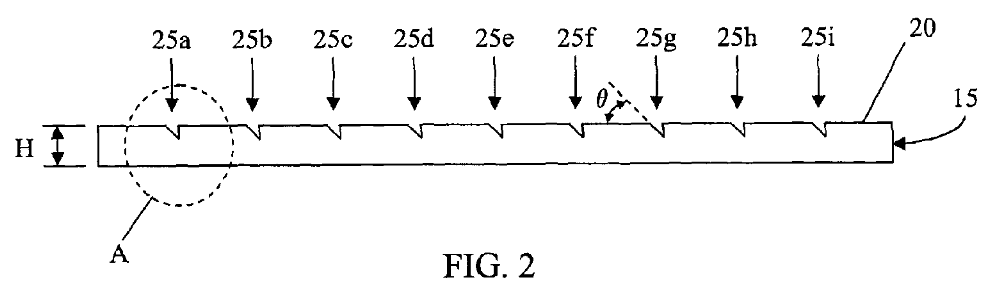
FIG. 2 shows side view of the sample holder of FIG. 1.

FIG. 2 shows a side view of the sample holder of FIG. 1. In embodiments, each one of the inclined regions 25 is structured and arranged to hold a test sample at a different predefined angle θ relative to horizontal. In specific embodiments, the test sample comprises a patterned silicon integrated circuit chip that is used for detecting the non-linearity of an atomic resolution measurement tool (e.g., an atomic force microscope (AFM)). For example, the chip may be about 1 mm by about 2 mm in size, and have a thickness of about 0.75 mm. However, the invention is not limited to a sample holder designed for a chip of this type and size, and as such any suitable test sample may be used with implementations of the invention.

In further embodiments, there are nine inclined regions 25, each having a shape to support a test sample 50 at a different pre-defined angle θ. For example, the first inclined region 25*a* is structured and arranged to support a test sample at an angle θ of about 1°, the second inclined region 25*b* at an angle θ of about 2°, the third inclined region 25*c* at an angle θ of about 3°, the fourth inclined region 25*d* at an angle θ of about 4°, the fifth inclined region 25*e* at an angle θ of about 5°, the sixth inclined region 25*f* at an angle θ of about 6°, the seventh inclined region 25*g* at an angle θ of about 7°, the eighth inclined region 25*h* at an angle θ of about 8°, and the ninth inclined region 25*i* at an angle θ of about 9°. However, the invention is not limited to nine inclined regions or these angle of inclinations. Instead, any suitable number of inclined regions 25 arranged at any suitable pre-defined angle may be used within the scope of the invention.

Figure 3:
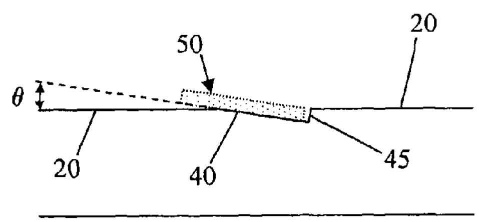
FIG. 3 shows an inclined region of the sample holder of FIG. 1.

FIG. 3 shows an enlarged view of an inclined region of the sample holder 10, as indicated by dashed circle "A" in FIG. 2. In embodiments, each respective inclined region 25 includes a first angled surface 40 and a second angled surface 45. The first angled surface 40 extends from the top surface 20 at an angle θ into the body of the block 15. The second angled surface 45 is arranged at substantially a 90° angle relative to the first angled surface 40, extending between the first angled surface 40 and the top surface 20. In this way, a test sample 50 (shown in dashed line) can be placed on the first angled surface 40, such that the test sample 50 is disposed at a pre-defined angle (i.e., θ) relative to horizontal.

In embodiments, each respective inclined region 25 has a different depth due to the different angle θ of each respective first angled surface 40. For example, the first inclined region **25*a* having an angle θ of about 1° has a depth of about 0.0022 inches; the second inclined region 25*b* having an angle θ of about 2° has a depth of about 0.0044 inches; the third inclined region 25*c* having an angle θ of about 3° has a depth of about 0.0065 inches; the fourth inclined region 25*d* having an angle θ of about 4° has a depth of about 0.0087 inches; the fifth inclined region 25*e* having an angle θ of about 5° has a depth of about 0.0109 inches; the sixth inclined region 25*f* having an angle θ of about 6° has a depth of about 0.0131 inches; the seventh inclined region 25*g* having an angle θ of about 7° has a depth of about 0.0152 inches; the eighth inclined region 25*h* having an angle θ of about 8° has a depth of about 0.0174 inches; and the ninth inclined region 25*i*** having an angle θ of about 9° has a depth of about 0.0196 inches.

Implementations of the invention provide for a test sample to be located at a first pre-defined angle relative to an atomic resolution measurement tool (e.g., an AFM) such that linearity measurements can be taken. Then, without having to remove the sample holder from the atomic resolution measurement tool, the test sample may be re-positioned at a second pre-defined angle relative to an atomic resolution measurement tool, such that additional linearity measurements can be obtained. In this manner, precise and repeatable linearity measurements are obtained, which leads to better characterization of the measurement tool.

In a specific exemplary implementation of the invention, the sample holder may be placed on a stage (e.g., surface) of an atomic resolution measurement tool (e.g., an AFM). In embodiments, the mass of the sample holder is sufficient to attach the sample holder to the stage, such that it is not necessary to use a clamp, vacuum, adhesive, or other attaching device to affix the sample holder to the stage. A test sample may be placed in a first one of the inclined regions, and scanning may be performed on the test sample. For example, the test sample may be arranged on the sample holder with or without the use of a clamp, vacuum, or adhesive. Subsequently, the test sample may be moved to another one of the inclined regions, and scanning performed on the test sample. In this manner, the sample holder is useful for facilitating multiple different linearity measurements, without having to affix the sample holder to the stage using additional attachment arrangements (e.g., clamps, vacuums, adhesives, etc.).

While the invention has been described in terms of embodiments, those skilled in the art will recognize that the invention can be practiced with modifications and in the spirit and scope of the appended claims.

What is claimed:

1. A holder for holding test samples used in measuring linearity of an atomic force microscope, comprising:

a body having a top surface; and a plurality of inclined regions formed in the body and spaced apart along the top surface;

wherein each of the inclined regions is structured and arranged to hold a test sample used to measure linearity of the atomic force microscope at one of a plurality of predefined angles, wherein the test sample comprises a patterned silicon integrated circuit chip that is used for detecting non-linearity of the atomic force microscope, each of the plurality of inclined regions comprises: a first surface that intersects the top surface at a respective one of the plurality of predefined angles; and a second surface that intersects the top surface, and the second surface intersects the first surface at an angle of approximately 90°, the top surface defines a substantially horizontal plane and the plurality of inclined regions comprises:

(i) a first inclined region arranged to hold the test sample at about 1° relative to the substantially horizontal plane and having a depth of about 0.0022 inches;

(ii) a second inclined region arranged to hold the test sample at about 2° relative to the substantially horizontal plane and having a depth of about 0.0044 inches;

(iii) a third inclined region arranged to hold the test sample at about 3° relative to the substantially horizontal plane and having a depth of about 0.0065 inches;

(iv) a fourth inclined region arranged to hold the test sample at about 4° relative to the substantially horizontal plane and having, a depth of about 0.0087 inches;

(v) a fifth inclined region arranged to hold the test sample at about 5° relative to the substantially horizontal plane and having a depth of about 0.0109 inches;

(vi) a sixth inclined region arranged to hold the test sample at about 6° relative to the substantially horizontal plane and having a depth of about 0.0131 inches;

(vii) a seventh inclined region arranged to hold the test sample at about 7° relative to the substantially horizontal plane and having a depth of about 0.0152 inches;

(viii) a eighth inclined region arranged to hold the test sample at about 8° relative to the substantialy horizontal plane and having a depth of about 0.0174 inches; and (ix) a ninth inclined region arranged to hold the test sample at about 9° relative to the substantially horizontal plane and having a depth of about 0.0196 inches, and the top surface comprises:

(a) a first horizontal portion that intersects the second surface of the first inclined region and the first surface of the second inclined region (b) a second horizontal portion that intersects the second surface of the second inclined region and the first surface of the third inclined region, (c) a third horizontal portion that intersects the second surface of the third inclined region and the first surface of the fourth inclined region, (d) a fourth horizontal portion that intersects the second surface of the fourth inclined region and the first surface of the fifth inclined region, (e) a fifth horizontal portion that intersects the second surface of the fifth inclined region and the first surface of the sixth inclined region, f) a sixth horizontal portion that intersects the second surface of the sixth inclined region and the first surface of the seventh inclined region, (g) a seventh horizontal portion that intersects the second surface of the seventh inclined region and the first surface of the eighth inclined region, and (h) an eighth horizontal portion that intersects the second surface of the eighth inclined region and the first surface of the ninth inclined region.

2. The holder of claim 1, wherein the body is composed of aluminum or brass and has a length of about 6.00 inches, a width of about 1.00 inches, and a height of about 0.25 inches.

3. The holder of claim 2 in combination with the atomic force microscope, wherein the body is structured and arranged to be attached to a surface of the atomic force microscope without using a clamp, vacuum, or adhesive.

4. A holder that holds a test sample for measuring linearity of an atomic force microscope, comprising:

a generally rectangular body having a horizontal top surface; and a plurality of inclined regions formed in the body and spaced apart along the horizontal top surface, wherein each respective one of the plurality of inclined regions is structured and arranged to hold the test sample comprising a patterned silicon integrated circuit chip used to determine linearity of the atomic force microscope at one of a plurality of predefined angles, each respective one of the plurality of predefined angles differs from an adjacent one of the plurality of predefined angles by about 1°, and each respective one of the plurality of inclined regions comprises:

a first surface that intersects the horizontal top surface at a respective one of the plurality of predefined angles, and a second surface arranged generally perpendicular to the first surface and intersecting the horizontal top surface and the first surface, wherein the body is structured and arranged to be attached to a surface of the atomic force microscope without using a clamp, vacuum, or adhesive.

5. The holder of claim 4, wherein the horizontal top surface defines a substantially horizontal plane and the plurality of inclined regions comprises:

(i) a first inclined region arranged to hold the test sample at about 1° relative to the substantially horizontal plane;

(ii) a second inclined region arranged to hold the test sample at about 2° relative to the substantially horizontal plane;

(iii) a third inclined region arranged to hold the test sample at about 3° relative to the substantially horizontal plane;

(iv) a fourth inclined region arranged to hold the test sample at about 4° relative to the substantially horizontal plane;

(v) a fifth inclined region arranged to hold the test sample at about 5° relative to the substantially horizontal plane;

(vi) a sixth inclined region arranged to hold the test sample at about 6° relative to the substantially horizontal plane;

(vii) a seventh inclined region arranged to hold the test sample at about 7° relative to the substantially horizontal plane;

(vii) a eighth inclined region arranged to hold the test sample at about 8° relative to the substantially horizontal plane; and (ix) a ninth inclined region arranged to hold the test sample at about 9° relative to the substantially horizontal plane.

6. The holder of claim 5, wherein the horizontal top surface comprises:

(a) a first horizontal portion that intersects the second surface of the first inclined region and the first surface of the second inclined region, (b) a second horizontal portion that intersects the second surface of the second inclined region and the first surface of the third inclined region, (c) a third horizontal portion that intersects the second surface of the third inclined region and the first surface of the fourth inclined region, (d) a fourth horizontal portion that intersects the second surface of the fourth inclined region and the first surface of the fifth inclined region, (e) a fifth horizontal portion that intersects the second surface of the fifth inclined region and the first surface of the sixth inclined region, (f) a sixth horizontal portion that intersects the second surface of the sixth inclined region and the first surface of the seventh inclined region, (g) a seventh horizontal portion that intersects the second surface of the seventh inclined region and the first surface of the eighth inclined region, and (h) an eighth horizontal portion that intersects the second surface of the eighth inclined region and the first surface of the ninth inclined region.

7. The holder of claim 6 in combination with the atomic force microscope wherein the body of the holder is attached to the surface of the atomic force microscope without using a clamp, vacuum, or adhesive.

8. The holder of claim 6, wherein:

the first inclined region has a depth of about 0.0022 inches;

the second inclined region has a depth of about 0.0044 inches;

the third inclined region has a depth of about 0.0065 inches;

the fourth inclined region has a depth of about 0.0087 inches;

the fifth inclined region has a depth of about 0.0109 inches;

the sixth inclined region has a depth of about 0.0131 inches;

the seventh inclined region has a depth of about 0.0152 inches;

the eighth inclined region has a depth of about 0.0174 inches; and the ninth inclined region has a depth of about 0.0196 inches.

9. The holder of claim 8, wherein the patterned silicon integrated circuit chip is about 1 mm by about 2 mm in size with a thickness of about 0.75 mm.

* * * * *